(12) United States Patent
Nakayama et al.

(10) Patent No.: US 6,517,923 B1
(45) Date of Patent: Feb. 11, 2003

(54) REFLECTIVE ARTICLE AND METHOD FOR MANUFACTURING THE SAME

(75) Inventors: Naoki Nakayama, Tendo; Kanya Mizufune, Yamagata, both of (JP)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 09/599,672

(22) Filed: Jun. 22, 2000

(30) Foreign Application Priority Data

Jun. 25, 1999 (JP) .......................................... 11-179721

(51) Int. Cl.⁷ .............................. B32B 1/04; B32B 3/04; G02B 5/124
(52) U.S. Cl. ........................... 428/68; 428/78; 428/124; 428/192; 359/530
(58) Field of Search .............................. 428/68, 77, 78, 428/124, 126, 174, 192, 913; 359/529, 530

(56) References Cited

U.S. PATENT DOCUMENTS

| | | | |
|---|---|---|---|
| 4,712,867 A | 12/1987 | Malek | 350/103 |
| 5,023,395 A | * 6/1991 | O'Connor | 428/124 |
| 5,318,822 A | * 6/1994 | Rhodes | 428/124 |
| 5,775,835 A | 7/1998 | Szekely | 404/34 |
| 5,901,428 A | 5/1999 | Sheridan | 29/509 |
| 5,975,706 A | 11/1999 | Nakayama | 359/530 |
| 6,127,020 A | 10/2000 | Bacon, Jr. et al. | 428/161 |

FOREIGN PATENT DOCUMENTS

| | | | |
|---|---|---|---|
| EP | 0 835 349 B1 | 9/1999 | E01F/9/04 |
| GB | 2 297 906 | 8/1996 | A47G/1/06 |
| GB | 2 323 878 | 10/1998 | E01F/9/012 |
| JP | 62-41804 | 3/1987 | F01L/13/06 |
| JP | 10-333616 | 12/1998 | G09F/13/16 |
| WO | WO 91/19857 | 12/1991 | E01F/9/08 |
| WO | WO 97/01677 | 1/1997 | E01F/9/04 |
| WO | WO 97/01678 | 1/1997 | E01F/9/04 |
| WO | WO 98/44202 | 10/1998 | E01F/9/015 |
| WO | WO 00/60386 | 10/2000 | G02B/5/128 |
| WO | WO 01/18569 A1 | 3/2001 | G02B/5/12 |

* cited by examiner

*Primary Examiner*—Donald J. Loney
(74) *Attorney, Agent, or Firm*—James V. Lilly

(57) ABSTRACT

A reflective article includes: a substrate sheet, and a retroreflective sheet covering a surface of said substrate sheet. The reflective article is provided with substantially flat base portions and a plurality of protrusions being partitioned off by the base portions and protruding toward said retroreflective sheet, and delamination of the substrate sheet and the retroreflective sheet from each other is prevented by folding back at least a part of an edge of one of the sheets so as to wrap at least a part of an edge of the other sheet therein in a condition that the reflective article is fixed to at least a surface of an object.

3 Claims, 2 Drawing Sheets

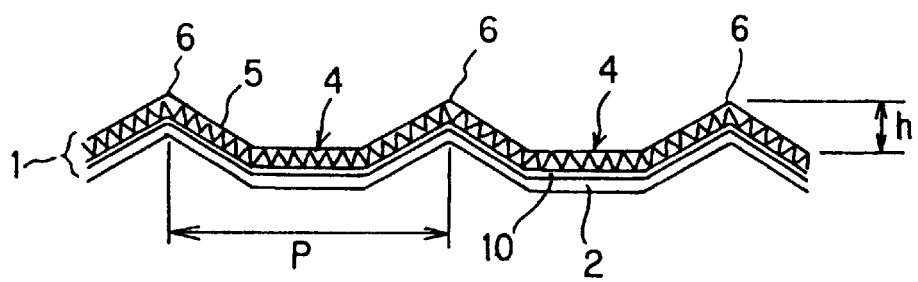
Fig. 1
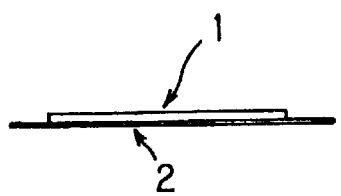  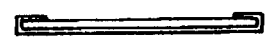
Fig. 2a   Fig. 2b   Fig. 2c
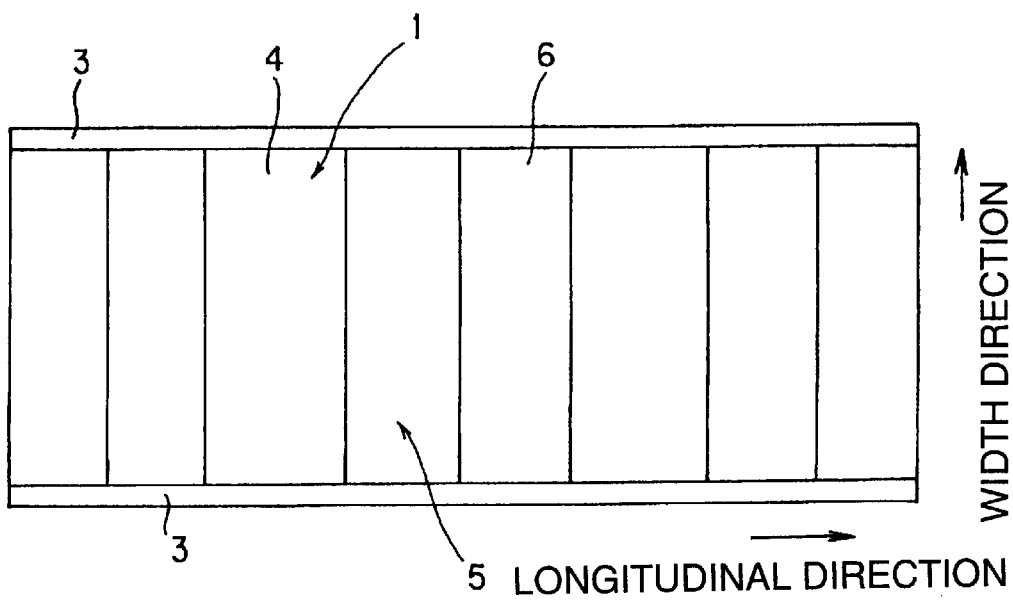
Fig. 3

REFLECTIVE ARTICLE AND METHOD FOR MANUFACTURING THE SAME

BACKGROUND OF THE INVENTION

The present invention relates to a reflective article comprising a substrate sheet and a retroreflective sheet fixed on a major surface of the substrate sheet. The article can be adhered to an object such as a wall inside a tunnel, a guardrail, or a sign, to enhance visibility of the object during the night. In particular, the present invention relates to a reflective article having a reflective surface having substantially flat base portions and a plurality of protrusions being partitioned off by the base portions and protruding toward the retroreflective sheet which provide excellent wide incidence properties such as visibility of incident rays in a wide range.

There are conventionally known reflective articles such as a reflective sheet and a plate having a reflective surface including substantially flat base portions covered by a retroreflective sheet and a plurality of protrusions covered by a retroreflective sheet. For example, Japanese Utility Model Publication 62-41804 discloses a reflective sheet having protrusions formed on the surface to prevent paper from adhering to the sheet. The reflective sheet is produced by, for example, pasting a retroreflective sheet on a surface of a substrate sheet and subjecting the sheets to embossing to form protrusions on its surface. However, the size of each of the protrusions is relatively small (for example, 2 mm in width and 1 mm in height). Further, the publication does not disclose dimensions or arrangement of the protrusions in a reflective sheet which provide wide incidence reflection properties.

International Publication Nos. WO97/01677 and WO97/01678 disclose retroreflective article which is not subjected to embossing but is covered with a retroreflective material and is provided with a reflective wall-like protrusions and a flat surface. In this reflective article, dimensions and arrangement of the protrusions can be selected so as to improve wide incidence reflection properties. The above wall-like protrusions are formed continuously so as to surround the flat surface. Incidentally, the protrusions are formed continuously so as to surround the flat surface that makes removal of a water drop or a solid foreign matter adhering to the flat surface relatively difficult.

On the other hand, Japanese Patent Laid-Open 10-333616 discloses a reflective plate which is formed by subjecting a laminate containing a substrate sheet and a retroreflective sheet fixed on a surface of the substrate sheet to embossing and which has a substantially flat base portion covered with a retroreflective sheet and a reflective surface covered by a retroreflective sheet and having a plurality of protrusions separately disposed via the base portion. The plurality of protrusions are arranged so as to form a regularly-repeated geometrical plane pattern. This publication discloses a mode in which the above protrusions are separately arranged via the base portion and are not wall-like protrusions formed continuously so as to surround the flat surface. In such a mode, it is very easy to remove a water drop or a solid foreign matter adhering to the flat surface.

As the above Japanese Patent Laid-Open 10-333616 discloses, it is necessary for the reflective protrusions to have predetermined sizes and a predetermined pattern of arrangement so as to form a sheet-shaped or a plate-shaped reflective article excellent in wide incidence reflection properties. Particularly, this is important to improve reflection properties to rays having a relatively high incidence (for example, 70° or more to the normal line to the reflective surface). When a reflective article is used as a constituent member of a marking used in the open air, solid foreign matter such as dust sticking to a reflective surface should easily be removed by a washing operation (or a cleaning operation). Thus, sufficient recovery of desired properties such as reflection brightness is possible.

Washing a reflective article manually using a wash apparatus is effective in the aforementioned washing operation (or the cleaning operation). Such a wash apparatus is used by spraying water under high pressure to the reflective surface of a reflective article, or blushing the reflective surface with a cleaning member such as a brush. For example, when a reflective article is fixed on a surface of an inner wall of a tunnel, the reflective article is washed simultaneously with the inner wall by a washing device which sprays water under high pressure and washes the inner wall of the tunnel.

However, in a reflecting element in which a retroreflective sheet is adhered on a substrate sheet, the retroreflective sheet is delaminated from a substrate sheet in an edge portion (a frame portion located at the end of the retroreflective sheet in a direction toward inside the reflective surface) by the aforementioned washing operation. In particular, when the retroreflective sheet has a direction of length and a direction of width, delamination in the end portion in a direction of width having a relatively long dimension is remarkable.

Therefore, the present invention aims to provide a reflective article and a method for manufacturing the reflective article capable of effectively preventing an end portion of a retroreflective sheet from delamination and exfoliating from a substrate sheet by a washing operation.

SUMMARY

The present disclosure is directed to a reflective article comprising a substrate sheet, and a retroreflective sheet covering a surface of said substrate sheet, wherein the reflective article is provided with substantially flat base portions and a plurality of protrusions being partitioned off by said base portions and protruding toward said retroreflective sheet. Delamination of said substrate sheet and said retroreflective sheet from each other is prevented by folding back at least a part of an edge of one of the sheets so as to wrap at least a part of an edge of the other sheet therein in a condition that the reflective article is fixed to at least a surface of an object. The above reflective article may be one in which both of the substrate sheet and the retroreflective sheet have directions of length and width, and at least one of portions around edges in a direction of width of the substrate sheet is fold back on the side of the retroreflective sheet.

Another aspect of the disclosure is a method for manufacturing a reflective article, comprising the steps of preparing a flat substrate sheet made of metal having drawing elongation ability of resin, forming a laminate by fixing a retroreflective sheet to a surface of said substrate sheet, wherein the retroreflective sheet has a shorter width than the substrate sheet, and a foldable portion elongated along the direction of width of the substrate sheet in a portion around an edge in a direction of width of the substrate sheet when the retroreflective sheet is attached to the substrate sheet, forming a folded portion by folding said foldable portion toward the side of the surface covered with said retroreflective sheet of the substrate sheet so as to cover in and around an end portion of said retroreflective sheet, subjecting the laminate to embossing by abutting an emboss tool having a plurality of bosses against the other surface of the substrate sheet to give said protrusions.

In the present specification, "folding back at least a part of an edge of one of the sheets so as to wrap at least a part of an edge of the other sheet therein" means the following conditions:

(i) A frame (an edge portion and its vicinity) of the above retroreflective sheet is covered by a folded portion formed by folding a frame (an edge portion and its vicinity) of the substrate sheet, or (ii) A frame (an edge portion and its vicinity) of the above substrate sheet is covered by a folded portion formed by folding a frame (an edge portion and its vicinity) of the retroreflective sheet.

Between the above two modes, (i) is preferable. The reason is that a retroreflective sheet used in the present invention usually has a cover layer of a light-transmitting film which covers a surface made of a reflective article such as beads or a reflective article made of a light-transmitting film (cube corner prism etc.). Such a light-transmitting film of the retroreflective sheet is prone to break when the retroreflective sheet is folded to make a relatively acute angle in the aforementioned manner. Therefore, the above mode (i) in which the retroreflective sheet is not folded is preferable. Though a folded portion may be formed after the reflective article is fixed to a surface of an object in the above mode (i), the folded portion is generally formed before the reflective article is fixed to a surface of an object.

The substrate sheet generally has a relatively longer length than a width. However, the length may be almost the same as the width as long as it does not impair the effect of the present invention. Though the retroreflective sheet generally has a relatively larger length than a width, the length may be almost the same as the width as long as it does not impair the effect of the present invention. A reflective article having a substrate and/or a retroreflective sheet having such dimensions generally has a relatively larger length than width, the length may be almost the same as the width as long as it does not impair the effect of the present invention.

The shape of the reflective protrusions is not particularly limited as long as it does not impair the effect of the present invention. However, it is preferable that the protrusions are continuously arranged from one end of the retroreflective sheet in the direction of the width to the other end thereof so as to form a line of protrusions. Such a line of protrusions has a reflective side surface (surface of a reflective sheet protruded in regard to a base portion) which is substantially perpendicular to the longitudinal direction and capable of reflecting a ray of light incident upon a wide reflective side surface. Therefore, a reflection brightness in the case that a reflective article is disposed on so that the longitudinal direction of the reflective article is substantially parallel to the road can be enhanced particularly effectively.

It is preferable to produce a reflective article having a line of protrusions by a method comprising the steps of:

(a) preparing a flat substrate sheet made of metal having drawing elongation ability of resin, (b) forming a laminate by fixing a retroreflective sheet to a surface of said substrate sheet so as to have shorter length in a direction of width than that of the substrate sheet and to have a foldable portion elongated along the direction of width of the substrate sheet in a portion around an edge in a direction of width of the substrate sheet when the retroreflective sheet is fixed to the substrate sheet, and
(c) forming a folded portion by folding said foldable portion toward the side of the surface covered with said retroreflective sheet of the substrate sheet so as to cover in and around an end portion of said retroreflective sheet, and (d) subjecting the laminate to embossing by abutting an emboss tool having a plurality of bosses against the other surface of the substrate sheet to give said protrusions.

In this method, a substrate sheet is subjected to folding prior to embossing which is a process for providing protrusions having a shape of a line or the like. Because folding is performed on the end portions of a retroreflective sheet and a substrate sheet are flat, the protrusions on the reflective surface do not hinder folding of the substrate sheet, which makes the folding operation easy. When the protrusions are not present in the edge portion of the reflective sheet (e.g. the protrusions are not arranged in line but on a plurality of dots regularly arranged on the reflective surface) and do not hinder folding of the substrate sheet, folding may be performed after embossing.

BRIEF DESCRIPTION OF THE DRAWINGS

FIG. 1 is a side-sectional view showing an embodiment of a reflective article of the present invention.

FIGS. 2(a), 2(b), and 2(c) are schematic view showing a process of folding edges of a reflective article of the present invention in a production process.

FIG. 3 is a developed view of a retroreflective sheet used in producing a reflective article of the present invention.

DETAILED DESCRIPTION OF THE INVENTION

Figure 4:
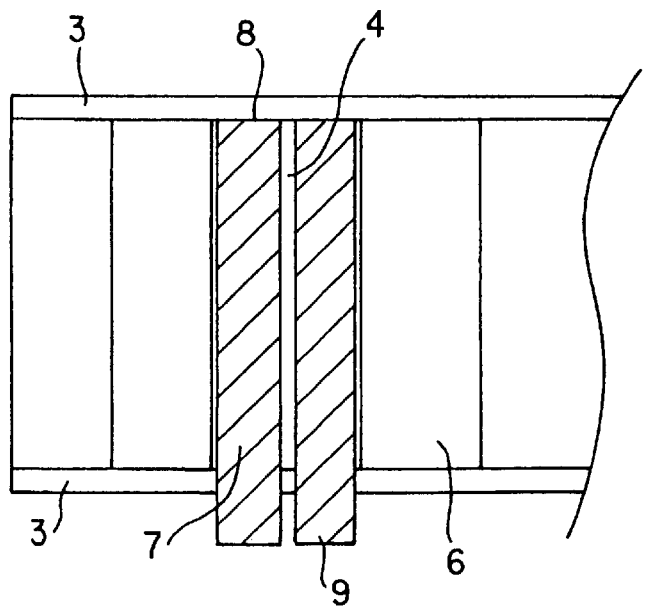
FIG. 4 is a schematic view showing conditions of attachment of a self-purifying member to a retroreflective sheet of the reflective article of the present invention.

The present invention is hereinbelow described more specifically on the basis of the embodiment.

FIG. 1 is a side-sectional view showing an embodiment of a reflective article of the present invention. The reflective article includes a substrate sheet (2) and a retroreflective sheet (1) covering a surface of the substrate sheet (2). A reflective article has a substantially flat base portion (4) and a plurality of protrusions (6) protruding toward the side of the retroreflective sheet (1) and partitioned by the base portion (4).

This reflective article prevents delamination of the retroreflective sheet (1) from the substrate sheet (2) by folding an edge of one of the sheets in at least a portion of a frame portion so that an edge of sheet (1) or sheet (2) wraps an edge of the other of sheets (1) or (2) at least where the reflective article is fixed on a surface of an object.

Reflective Article

A reflective article according to the present invention is categorized as a wide incidence reflective article. "A wide incidence reflective article" as used herein refers to a reflective article having a sufficient level of reflection brightness of light emitted from the direction near a normal of a horizontal surface and a visible level (for example, 1.5 CPL or more) of reflection brightness of light emitted from the direction near the horizontal surface. In other words, a reflective article of the present invention has such sufficient reflection properties that reflection brightness does not extremely decrease (for example, it does not decrease to 1 CPL or lower) when incidence is changed from the direction near a normal of the horizontal surface of the reflective article to the direction near the horizontal surface. A range of an incidence in which a reflective article of the present invention exhibits sufficient reflective properties is at least 0–75°, and preferably 0–86°. The angle is an angle from a normal of a flat surface of a base portion of a reflective article.

The following relation (1) shows a correlation of each parameter for suitably designing dimensions and arrangement of protrusions. When the arrangement and dimensions of the protrusions follow this relation, the protrusions are arranged separately from one another according to a pattern formed by regularly repeating one or a plurality of geometrical plane patterns. Since the protrusions are separate and independent from one another, a solid foreign matter adhering to the reflective surface can be easily removed.

$$0.05 < h/P < 0.60 \qquad (I)$$

P denotes a distance (pitch) between mutually adjacent two protrusions, and H denotes a height of a protrusion measured from a surface of the base portion.

When a plurality of Ps are fixed, the largest P is employed. For example, in the case that dot-shaped protrusions (6) are disposed on the four apexes of a rhomb, a distance between two protrusions (6) along a diagonal line is employed as P. When protrusions (6) are continuously formed from one end of a direction of width of a retroreflective sheet to the other end, P is a distance between two protrusions (6) in a cross-section perpendicular to the line of protrusions (6) (a cross-section along the longitudinal direction of the retroreflective sheet (1)) as shown in FIG. 1.

When an arrangement and size of a line of protrusions is fixed, it may be supposed that a line of protrusions is disposed so as to pass across the two apexes of a rectangle according to a pattern formed by regularly repeating rectangles. That is, lines of protrusions are formed on mutually parallel sides of a rectangle, and the lines are mutually separate and independent.

When a value of h/P of the formula (I) is 0.05 or less, reflection brightness to a ray having a relatively high incidence is prone to deteriorate. In contrast, when a value of h/P of the formula (I) is 0.60 or more, it is apprehended that an incidence capable of obtaining sufficient reflection brightness cannot be designed to be high (e.g., 70° or higher). From such a view, a value of h/P of the formula (I) is preferably within the range from 0.07 to 0.47, and more preferably 0.08–0.30.

In the case that the maximum incidence capable of reflecting with sufficient brightness in a protruding portion is θ, h/P of the formula (I) is almost the same as a tangent of the angle (90-θ), i.e., tan (90-θ).

The lower limit of the formula (I) of 0.05 and the upper limit of 0.60 have almost the same meaning as the lower limit of θ of about 60° and the upper limit of about 87°.

P is generally 4 mm or more. If P is smaller than this, it is apprehended that reflective properties of a ray having a high incidence cannot be improved. If it is too large, a disposition density of protrusions becomes small, and an effect of improving reflective properties of a ray of high incidence is prone to be lowered. From such a viewpoint, P is preferably 8–30 mm, and more preferably 10–25 mm.

On the other hand, h is generally 0.5 mm or more. If it is smaller than 0.5, it is apprehended that reflective properties to a ray having a high incidence cannot be improved. If it is too large, the retroreflective sheet (1) is prone to be damaged upon forming the protrusions (6). From such a viewpoint, h is preferably 1–10 mm, and more preferably 1.5–5 mm. A distance between boundary point of the protrusions and an adjacent base portion (4) in a cross-section in a perpendicular direction (ref. FIG. 1) is generally 5 mm or more. If it is too small, it is apprehended that reflective properties of a ray having a high incidence cannot be improved. If a width of the protrusions is too large, a density of disposition of protrusions (6) becomes small, and an effect of improving reflective properties of a high incidence is prone to be lowered. From such a viewpoint, the width is preferably 10–40 mm, and more preferably 15–35 mm.

It is preferable that the protrusions (6) are in accordance with a pattern formed by regularly repeating one or a plurality of geometrical plane figures and are mutually separately disposed at all apexes of the figures. Each of the protrusions (6) is disposed so that the center of gravity (center in the case of a circle) of a bottom figure (a horizontal cross-section in a boundary surface with the bottom portion) substantially coincides with an apex of the geometrical figure (the disposition center of the protrusions). The center of gravity of a figure can be obtained by a mathematical technique. A shape of the geometrical figure is not particularly limited as long as it satisfies the formula (I). For example, in a level surface including the base portion (4), it may be a rectangle, a polygon such as a pentagon and a hexagon, or a rhomb formed by disposing two triangle so that a side of each triangle contacts each other. There is a case that a plurality of geometrical plane figures are present in an arranged pattern, and therefore a plurality of P values are determined. However, it is preferable that all P values satisfy the formula (I) for improvement in reflective properties of a high incidence.

A disposition density of protrusions (6) is determined so that the minimum size in a horizontal direction (e.g., a size along to the longitudinal direction of the retroreflective sheet (1) in FIG. 1) of the base portion (4) disposed in a gap between mutually adjacent two protrusions is generally 2–20 mm, and preferably 3–15 mm. In the case that the disposition density is either too small or too large, reflection properties in a high incidence are prone to lowering. As a shape of the protrusions (6) in a cross-section in a perpendicular direction, there may be employed, for example, a half circle, a half oval, a half circle or oval from which a top portion thereof is cut off in a horizontal direction, a triangle, a trapezoid, or a tetragon. A plurality of protrusions may include protrusions having two or more solid shapes as long as it does not detract an effect of the present invention.

Each of the protrusions (6) formed by embossing is hollow on the side of the back surface of the substrate sheet. In this case, the protrusions are prone to deformation due to external force, although it depends on thickness of the substrate sheet. It is preferable to fill the protrusions with resin or the like for reinforcement. A resin capable of curing due to ultraviolet rays, electron rays, heat, moisture, or the like, can may be used. A reinforcing effect of such a curing resin can be shown by curing after the curing resin is filled in the hollow.

When protrusions (6) form lines, the lines are generally disposed separately via a base portion (4) along the longitudinal direction of the substrate sheet (2). In such a case, a longitudinal direction of the lines is generally made to be substantially parallel along the direction of the width of the substrate sheet. Alternatively, it is preferably made perpendicular to a direction of incidence of a light. This can effectively enhance reflection brightness of a reflective article. For example, when light is admitted in substantially parallel to a longitudinal direction of the substrate sheet (i.e., reflective article), it is preferable that a longitudinal direction of a line of protrusions is substantially parallel along a direction of width of a substrate sheet generally. On the other hand, when light is admitted with an incidence with a predetermined angle from a longitudinal direction of the reflective article, it is preferable that a longitudinal direction of a line of protrusion is not parallel to a direction of width of a substrate sheet but perpendicular to a direction of an incidence of the light. In the case that light is admitted with a plurality of incidences, it is preferable that a line of protrusion is not straight but turned with a number of corners or curved.

Substrate Sheet

A substrate sheet (2) is generally made of metal or plastic. Among them, soft metal or soft plastic are preferable since they are excellent in drawing properties. Such materials can be easily subjected to embossing (and folding), and thereby protrusions (6) and folded portions (3) can be easily formed. As soft metal, aluminum, copper, silver, gold, and the like are preferable. As soft plastic, polyethylene, polypropylene, poly (vinyl chloride), polyurethane, and the like are preferable. Thickness or properties such as tensile strength is not particularly limited as long as it does not detract an effect of the present invention. However, in the case that a reflective article is formed by embossing and folding as described later, it is preferable that properties of the substrate sheet are selected as follows. A preferable range of thickness is 0.05–2 mm in the case of metal, and 0.1–5 mm in the case of plastic. When it is too thin, the substrate sheet is prone to break upon forming protrusions by embossing. When it is too thick, the forming of protrusions by embossing becomes difficult. Tensile strength is preferable 1–15 kg/mm$^2$, and particularly preferably 2–12 kg/mm$^2$. When the tensile strength is less than 1 kg/mm$^2$, the substrate sheet is prone to break upon embossing or folding. When the tensile strength is above 15 kg/mm$^2$, it is apprehended that the working becomes difficult.

Retroreflective Sheet

A retroreflective sheet (1) has a coat layer of a translucent film and can employ a capsule lense where a surface of a reflective article such as a bead is not exposed or a sealed lense. For example, a prism type retroreflective sheet can be formed by sealing a prism reflective article in a capsule-shape by using a translucent film having a prism reflective article such as a cube corner prism and placing a sealing layer on the backside of the translucent film. In a prism-type reflective sheet, a surface of the translucent film (a generally flat surface without any prism reflective article) is a reflective surface (5). There may be used, for the above translucent film, acrylic resin, polyester resin, fluororesin, polyolefin resin, polyvinylchloride resin, or the like. All light transmittance of the translucent film is generally 80% or more.

Examples of a reflective sheet having a coat layer are No. 580, No. 3810, and No. 1570 of Scotch Light (trademark) produced by 3M Innovative Properties Company. Examples of a prism-type reflective sheet are No. 981 of Scotch Light (trademark) produced by 3M. Properties such as breaking elongation, fracture strength, and thickness of the reflective sheet are not particularly limited as long as they do not detract an effect of the present invention. However, when a reflective article is formed by embossing, it is preferably selected as follows: Breaking elongation is preferably 5–300%, particularly preferably 10–280%. If the breaking elongation is above 300%, it is apprehended that creases are generated on a reflective surface upon embossing. In contrast, if the breaking elongation is below 5%, it is apprehended that embossing becomes difficult. Fracture strength is preferably 1.0–10.0 kg/25 mm, particularly preferably 3.0–7.0 kg/25 mm. When the fracture strength is below 1.0 kg/25 mm, the reflective sheet is prone to break upon embossing. In contrast if the fracture strength is above 10 kg/25 mm, it is apprehensive that embossing becomes difficult. A preferable range of the thickness is 10–750 $\mu$m. If it is below 10 $\mu$m, the reflective sheet is prone to break upon embossing. In contrast, if it is above 750 $\mu$m, it is apprehended that embossing becomes difficult.

For fixing a retroreflective sheet (1) to a substrate sheet (2), for example, an adhesive (10) may be used. There may be used, as an adhesive, an acrylic adhesive, a polyolefin adhesive, a polyuretbane adhesive, a silicone adhesive, an epoxy resin, or the like. As an adhesive, a pressure sensitive adhesive, a heat sensitive adhesive (including hot melt), a curing adhesive, or the like, may be employed. Among them, a pressure sensitive adhesive is most preferable because a pressure sensitive adhesive has high flowability, and thereby protrusions can be easily formed by embossing. An adhesive (10) is generally disposed between a substrate sheet and a reflective sheet to form a laminate, and the laminate has a thickness of generally 5–50 $\mu$m.

Adhesive Layer

An adhesive layer may be provided on a back surface of a substrate sheet (a surface where a reflective sheet is not placed). The adhesive layer is used for sticking a reflective article on an object such as a guardrail. As an adhesive for such an adhesive layer, an adhesive similar to the aforementioned ones may be used. The adhesive layer is generally protected by a liner. A preferable liner is a release paper formed by sticking a resin sheet made of polyethylene, polypropylene, or the like, and paper or a film made of resin such as polyethylene terephthalate, polyethylene, polypropylene, or the like.

Manufacture of Reflective Article

It is preferable that a reflective article is produced by a method including an operation for forming protrusions (6) by embossing. Because protrusions having predetermined shape, size and arrangement can be accurately formed. For embossing, an emboss tool having a plurality of protrusions with predetermined shape, size and arrangement are pressed against a substrate sheet from the side of a back surface. The shape, size and arrangement are designed so as to correspond to those of a reflective article. A pressure for embossing is usually 1–100 kg/cm$^2$, and preferably 20–80 kg/cm$^2$. The pressure is applied by a press operation such as mechanical pressing or pressure reducing press. A combination of the first tool composed of a plate having the aforementioned protrusion on the surface thereof or a roll and the second tool abutting on a surface of a retroreflective sheet can be used. There may be used, as the second tool, a tool having a depression capable of receiving protrusions of the first tool or a tool having a flat surface and made of a material capable of deforming when the first tool is pressed against the substrate sheet from the back surface thereof As a material for the second tool (a tool having a flat surface), rubber, elastomer, or the like can be used.

In a method for producing by embossing, the same conditions and the same emboss tool are employed. A laminate including a retroreflective sheet (2) and an adhesive layer protected by a liner are formed on a surface and a back surface of the substrate sheet (2) as mentioned above. An emboss tool having a plurality of protrusions is pressed against the liner of the laminate to form protrusions. Alternatively, the embossing may be performed after an indication of letters, designs, or the like is printed on the surface of the coat layer. Besides, a reflective article of the present invention may be produced in a manner that a retroreflective sheet is superposed on a substrate sheet having previously-formed protrusions, and then, the reflective sheet is pressed into contact with the substrate under a reduced pressure.

On the other hand, a method for producing a folded portion (3) protecting an edge portion of a retroreflective sheet, including a forming operation is as shown in FIG. 2. First, a flat substrate sheet made of metal or resin having drawing elongation ability is prepared as a substrate sheet. Then, a retroreflective sheet (1) is fixed on a surface of the substrate sheet (2) to form a laminate. At this time, a length the retroreflective sheet (1) in a direction of width is smaller than that of the substrate sheet (2). The substrate sheet has a foldable portion extended along a direction of width of the substrate sheet from a portion where an end in a direction of width of the retroreflective sheet is fixed. As shown in FIG. 3, it is preferable that a folded portion (3) covers both ends of the retroreflective sheet (1) in a direction of width. Therefore, as shown in FIG. 2, the retroreflective sheet is fixed in a central portion in a width of the substrate sheet so that a longitudinal direction of the retroreflective sheet (1) substantially coincides with a longitudinal direction of the substrate sheet (2), and foldable portions are formed at both ends of the substrate sheet in a direction of width. The thus formed foldable portions are folded toward the side of the surface of the substrate sheet to form a folded portion (3) covering an end portion of the retroreflective sheet and the vicinity of the end portion. The folding can be performed manually or by a machine such as a bender. It is preferable that the folded portion (3) adheres to a surface (reflective surface) of the reflective sheet so as not to form a gap between a folded portion. This is because it prevents invation of water drops or solid freign substances and enhances durability of the folded portion in the case that the reflective article is used outdoor.

A dimension in a direction of a width of the folded portion (a dimension along a direction of a width of the substrate sheet in the case of the figure) is not particularly limited as long as it does not detract an effect of the invention. It is generally 2–30 mm, and preferably 5–20 mm. When the dimension in a direction of a width of the folded portion is too small, the folded portion (3) is prone to delaminate during a washing operation. When it is too large, an area of an exposed reflective surface (5) (a portion not covered by the folded portion) becomes small, and brightness is prone to deteriorate. In the case that the substrate sheet (2) is made of metal, the substrate sheet has spreadability (or plastic deformability). Therefore, conditions of a folded portion can be easily retained after being subjected to folding. However, the folding portion (3) may be bonded to the reflective surface (5) as necessary. In the case when a substrate sheet is made of soft plastic, there is a case that the substrate sheet rises over the reflective surface (5) because the substrate sheet has a measure of elasticity, and elasticity of the folded portion (3) is recovered. In that case, the folded portion may be bonded (Fusion is included.) to the reflective surface as necessary.

Generally, the folded portion (3) is continuously extended along a longitudinal direction of the retroreflective sheet. However, the folded portion (3) may be discontinuously extended along a longitudinal direction of the reflective sheet as long as it does not detract an effect of the invention. In the case that the folded portion is discontinuously arranged, it may be arranged only in a part of the base portion (4). Though, as shown in FIG. 3, an opened end of the folded portion is linear, it may be corrugated, saw-toothed, comb-shaped, or non-linear. In the case when the open end is non-linear, an exposed area of the reflective surface can be preferably enlarged as much as possible. In this case, it is preferable to make a size (dimension along to a direction of width of the substrate sheet in the case of FIG. 3) of the folded portion of a portion of protrusions smaller than that of the base portion (4).

The folded portion may cover one or two end portions in a longitudinal direction of the retroreflective sheet.

Use for Reflective Article

A reflective article of the present invention can be particularly usefully used for a delineator or a traffic-control sign fixed by the side of road or on a wall inside a tunnel, where light is irradiated with a relatively high incidence due to, for example, a headlight of automobiles or the like. Further, a reflective article of the present invention can enhance visibility of a guardrail, a signboard, an indicator or the like on which the reflective article is fixed during the night. That is, by providing a reflective article on such an object, an observer such as driver can perceive the object even from a relatively far site. When the reflective article is fixed on one of the aforementioned object, there may be used a fixing means such as a screw or a bolt besides the aforementioned adhesive.

Further, it is good to regularly conduct cleaning to keep a reflective surface of the reflective article clean. It is better if a polluted surface can be kept clean in a period from the completion of cleaning to the next cleaning. Therefore, it is preferable that a reflective surface is covered with a translucent protective film containing a light solvent such as titanium, or a self-cleaning member (7) is used as shown in FIG. 4. A self-cleaning member (7) shown in FIG. 4 is made of a thin piece of cloth, film or the like. One end of the self-cleaning member is fixed in a reflective surface of a reflective article so that the member flutters in a wind naturally or generated when a vehicle passes. When this thin piece flutters, the piece rubs the reflective surface to exhibit a self-cleaning effect.

Incidentally, a reflective article is arranged so that a longitudinal direction of the reflective article (substrate sheet and retroreflective sheet) is substantially parallel to a direction of extension of a road. Therefore, the thin piece hangs down along the perpendicular direction when wind pressure does not function. In this case, an end is fixed to the upper end of the reflective article in a direction of width, i.e., a direction of gravity. The thin piece is preferably translucent. A translucent thin piece is made of, for example, transparent film, mesh, net, or the like, a translucent material, a non-translucent piece having at least one perspective window. Instead of the thin piece, a string such as lope or thread may be used.

As shown in FIG. 4, it is preferable that the self-cleaning member (7) disposed so that only a base portion (4) is covered and a surface of a protrusion (reflective side surface) is not covered when wind pressure does not function. When a reflective article of the present invention is used as a delineator or the like, it generally reflects light having a relatively high incidence, and an observer perceives the light. Therefore, reflected light from the reflective side surface of the protrusion functions more usefully to enhance visibility than the base portion. Therefore, it is preferable to arrange a self-cleaning member as described above. Incidentally, the self-cleaning member is fixed so as to sandwich an end to be fixed between the folded portion and the retroreflective sheet as shown in FIG. 4. Dropping off of the self-cleaning member from the reflective article can be effectively prevented. Further, an end to be fixed of the self-cleaning member may be fixed at a spot so that it can swing like a pendulum.

A length of the self-cleaning member (7) (distance from the end to be fixed (8) to the non-fixed end (9)) is not particularly limited. For example, in the case that the protrusions are arranged to form a line at intervals along a direction of width as shown in the figure, it is preferable that the distance is the same as or more than a distance from an end of the substrate portion where a fixed end is located in a direction of width to the lower end of an apex (a ridgeline) of the line of protrusion adjacent to the base portion in a direction of gravity.

EXAMPLE

The present invention is hereinbelow described more with Example and Comparative Example. However, the present invention is by no means limited to these examples.

Example 1

A soft aluminum (AIN30H-O produced by Toyo Aluminum) was used as a substrate sheet, and a prism-type reflective sheet No. 981 produced by 3M was used as a retroreflective sheet. The soft aluminum has a thickness of 0.08 mm and a tensile strength of about 8 kg/mm$^2$. A reflective sheet has a thickness of 170 μm, a fracture elongation of 200%, and a fracture strength of 4.8 kg/25 mm. The retroreflective sheet (1) adheres to the substrate sheet (2) by means of a layer of an acrylic pressure sensitive adhesive provided on a back surface of the reflective sheet to obtain a laminate constituted by the retroreflective sheet and the substrate sheet. The substrate sheet and the reflective sheet adhered to each other so that a margin (foldable portion) to be a folded portion (3) is formed in both end portions of the substrate sheet in a direction of width.

The laminate obtained in the above manner was first subjected to folding schematically shown in FIG. 2. A foldable portion shown in FIG. 3 was subjected to folding toward the side of the surface of the substrate sheet to form a folded portion covering an end portion and the vicinity the end portion of the retroreflective sheet. The folding was performed by the use of a machine (bender). The folded portion (3) was attached to a surface (reflective surface) of the reflective sheet so as not to form a gap between the reflective sheet and the folded portion.

Figure 5A:
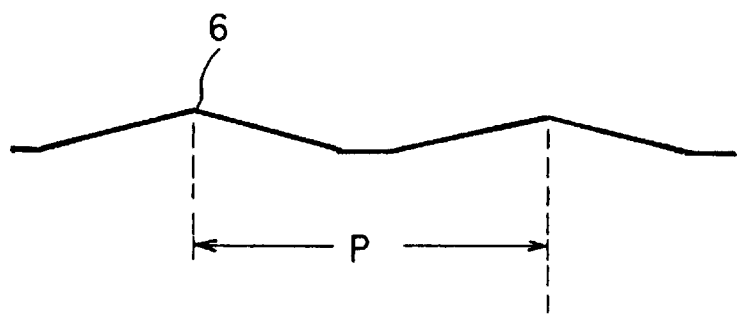
FIG. 5(a) is a schematic view of a section of a mode of a reflective article of the present invention.
Figure 5B:
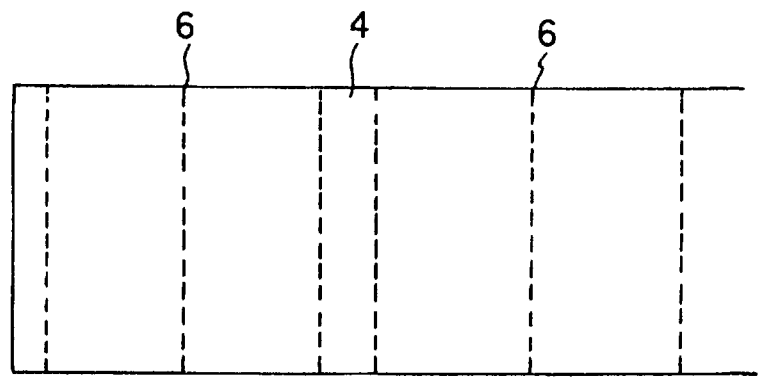
FIG. 5(b) is a schematic view showing a geometrical pattern of the reflective article.

Subsequently, the laminate was subjected to embossing to complete a reflective article of the present invention. The embossing was performed by pressing a plurality of protrusions on an emboss tool against to the substrate sheet on its backside (a surface opposite to the reflective sheet surface). The embossing was performed under an emboss pressure of about 70 kg/mm$^2$ by the use of the first tool having protrusions and the second tool having a depression capable of receiving the protrusions of the first tool. A geometrical pattern having a line of protrusions and a base portion is shown in FIGS. 5(a) and 5(b). In this example, protrusions (6) formed a plurality of lines extending in parallel to each other along a direction of width (i.e., a direction of width of the completed reflective article) of the substrate sheet. The protrusions had a width of 25 mm, a pitch of 15 mm, and a height of 2.5 mm. The reflective article had a length of 50 cm and a width of 20 cm.

Example 2

A reflective article of the present invention was produced in the same manner as in Example 1 except that the folded portion is was not provided.

EVALUATION OF EXAMPLE 1 AND EXAMPLE 2

First, the reflective articles obtained in Example 1 and Example 2 were fixed on a wall perpendicular to the ground. Water was sprayed to the end portions and in the vicinity of the end portions of each reflective article in the direction of width by a high-pressure car-washer to confirm if delamination of the reflective sheet is caused in the end portions. The water was sprayed under conditions of a distance of 30 cm between a spray nozzle and the end portion of the reflective article and a spray time of 1 minute. As a result, observation by naked eye was performed with regard to delamination in the end portion of the reflective sheet. In Example 1, no difference was found between the reflective sheet before spraying of water and after the completion of spraying. On the other hand, delamination of the reflective sheet was observed after the completion of spraying.

A reflective article of the present invention is at least in a condition that the reflective article is fixed on a surface of an object, for example, an inner wall of a tunnel. At least one end portion of the aforementioned retroreflective sheet in a direction of width is covered with the aforementioned substrate sheet. Therefore, delamination of the end portion of the retroreflective sheet can be effectively prevented even if the reflective article is subjected to regular washing operation.

What is claimed is:

1. A reflective article comprising:

a substrate sheet, and a retroreflective sheet covering a surface of said substrate sheet;

wherein the reflective article is provided with substantially flat base portions and a plurality of protrusions being partitioned off by said base portions and protruding toward said retroreflective sheet, and delamination of said substrate sheet and said retroreflective sheet from each other is prevented by folding back at least a part of an edge of one of the sheets so as to wrap at least a part of an edge of the other sheet therein in a condition that the reflective article is fixed to at least a surface of an object.

2. A reflective article according to claim 1, wherein both of said substrate sheet and said retroreflective sheet have directions of length and width, and at least one of portions around edges in a direction of width of said substrate sheet is fold back on the side of the retroreflective sheet.

3. Method for manufacturing a reflective article according to claim 2, comprising the steps of:

(a) preparing a flat substrate sheet made of metal having drawing elongation ability of resin, (b) forming a laminate by fixing a retroreflective sheet to a surface of said substrate sheet so as to have shorter length in a direction of width than that of the substrate sheet and to have a foldable portion elongated along the direction of width of the substrate sheet in a portion around an edge in a direction of width of the substrate sheet when the retroreflective sheet is fixed to the substrate sheet, and (c) forming a folded portion by folding said foldable portion toward the side of the surface covered with said retroreflective sheet of the substrate sheet so as to cover in and around an end portion of said retroreflective sheet, and (d) subjecting the laminate to embossing by abutting an emboss tool having a plurality of bosses against the other surface of the substrate sheet to give said protrusions.

* * * * *

UNITED STATES PATENT AND TRADEMARK OFFICE
CERTIFICATE OF CORRECTION

PATENT NO.     : 6,517,923 B1
DATED          : February 11, 2003
INVENTOR(S)    : Nakayama, Naoki It is certified that error appears in the above-identified patent and that said Letters Patent is hereby corrected as shown below:

<u>Title page,</u>
Item [56], References Cited, U.S. PATENT DOCUMENTS, please add
-- 5,837,350    11/1998         Jacobs --
FOREIGN PATENT DOCUMENTS, please add
        BE    1012765A3    3/2001
        DE    G9401987.8   5/1994
        DE    43 34 659 A1  4/1995
        IT    00222771     6/1990
        IT    00222772     6/1990
        IT    00222773     6/1990
        IT    00222774     6/1990
        IT    00222775     6/1990
        JP    01281427A    10/2001
        JP    012814287    10/2001 --

<u>Column 7,</u>
Line 52, delete "3810," and insert in place thereof -- 3810J, --.

<u>Column 8,</u>
Line 11, delete "polyuretbane" and insert in place thereof -- polyurethane --.
Line 53, delete "thereof As" and insert in place thereof -- thereof. As --.

Signed and Sealed this

Seventh Day of October, 2003

JAMES E. ROGAN
*Director of the United States Patent and Trademark Office*